United States Patent [19]
Suzuki

[11] Patent Number: 5,313,458
[45] Date of Patent: May 17, 1994

[54] TRAFFIC CONTROL SYSTEM

[75] Inventor: Hiroyuki Suzuki, Kawasaki, Japan

[73] Assignee: Fujitsu Limited, Kawasaki, Japan

[21] Appl. No.: 892,193

[22] Filed: Jun. 2, 1992

[30] Foreign Application Priority Data

Jun. 3, 1991 [JP] Japan ................... 3-160038

[51] Int. Cl.[5] .......................... H04J 3/17; H04J 3/24
[52] U.S. Cl. ........................ 370/56; 370/80; 370/94.1; 370/112
[58] Field of Search .............. 370/60, 60.1, 84, 94.1, 370/94.2, 99, 102, 110.1, 112, 85.7, 56, 80, 81

[56] References Cited

U.S. PATENT DOCUMENTS

| | | | |
|---|---|---|---|
| 4,646,287 | 2/1987 | Larson et al. | 370/94.1 |
| 4,799,215 | 1/1989 | Suzuki | 370/94.1 |
| 4,833,673 | 5/1989 | Chao et al. | 370/102 |
| 4,849,968 | 7/1989 | Turner | 370/94.1 |
| 4,935,921 | 6/1990 | Ishizaki et al. | 370/102 |
| 5,040,170 | 8/1991 | Upp et al. | 370/112 |
| 5,079,763 | 1/1992 | Chao et al. | 370/85.7 |

FOREIGN PATENT DOCUMENTS

| | | |
|---|---|---|
| 56-132853 | 10/1981 | Japan . |
| 57-54453 | 3/1982 | Japan . |
| 2190056 | 7/1990 | Japan . |
| 381850 | 4/1991 | Japan . |

*Primary Examiner*—Douglas W. Olms
*Assistant Examiner*—Alpus H. Hsu

[57] ABSTRACT

To suppress the amount of data frames passing through a public network and to provide advantages for both the telephone company and subscribers, a traffic control system is provided for controlling traffic in data frames transmitted between a public network and a subscriber through channels. Each data frame consists of a header and a payload. The header includes a predetermined bit indicating whether or not the payload includes traffic data. The system comprises, between the public network and the subscriber, a traffic control unit that includes channel filters each for receiving data frames from the subscriber through the corresponding channel, and for transmitting each data frame to the public network only when the predetermined bit in the header of the data frame indicates that the payload includes traffic data, and a channel reproducing unit for receiving data frames from the public network, and for reproducing an omitted data frame that has been discarded, to transmit the received data frames and the reproduced data frame to the subscriber.

10 Claims, 5 Drawing Sheets

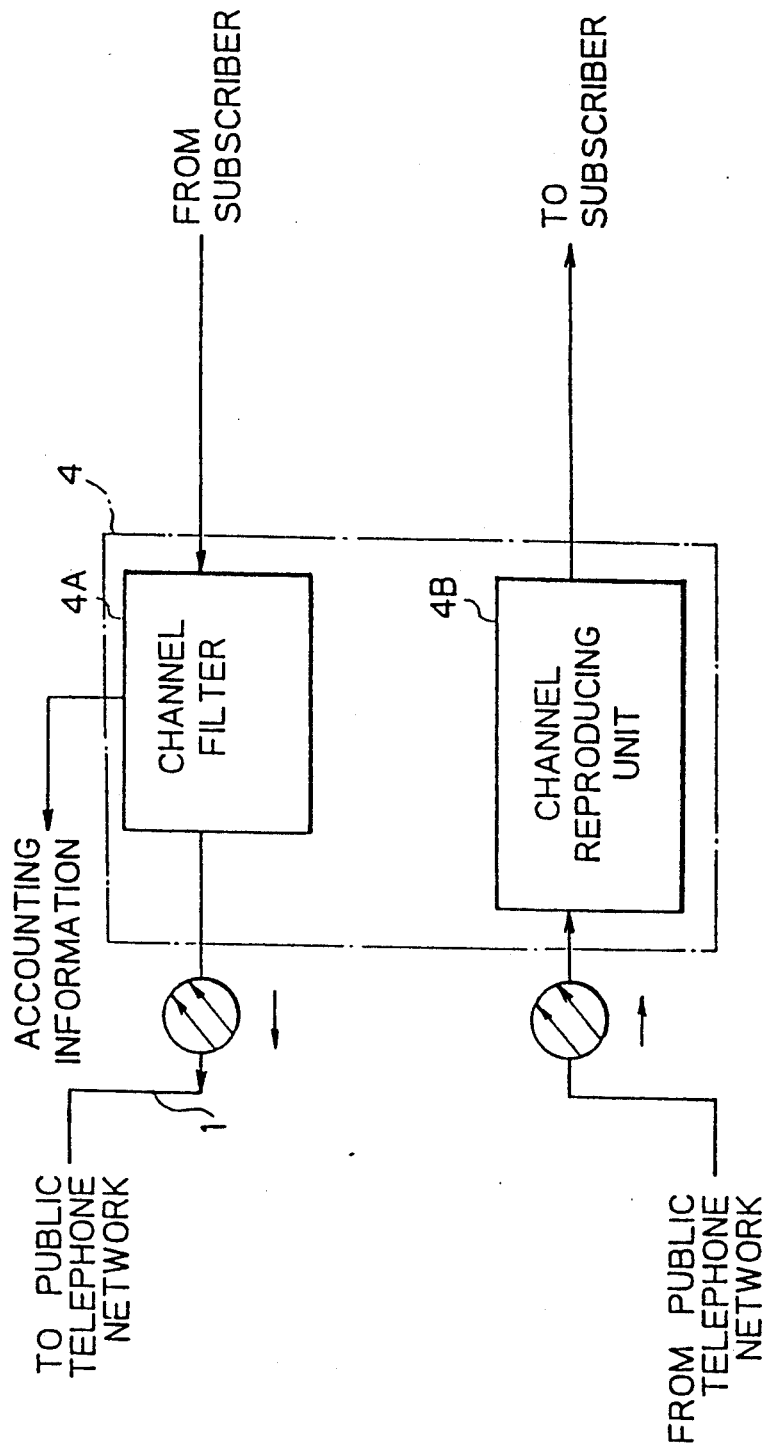

TRAFFIC CONTROL SYSTEM

BACKGROUND OF THE INVENTION

(1) Field of The Invention

The present invention relates to a traffic control system, and more particularly to a system for controlling traffic of data on a digital leased line between a public network and a subscriber system (herein after simply referred to as a subscriber).

To access a public network belonging to a telephone company through a digital leased line from a subscriber, it is preferable to be provided with various leased lines of various bit rates corresponding to the bit rates of respective subscribers.

(2) Description of The related Art

Conventionally, leased lines of 2.4 Kb/s to Kb/s, 1.5 Mb/s. 45 Mb/s and so forth have been prepared for practical use between each subscriber and a public network. Such a bit rate of a leased line, however, is insufficient for future subscriber services in which a large capacity is considered necessary.

To cope with the increase of the capacity of services, use of an optical transmission system, such as the already proposed SONET (Synchronous Optical Network) system, is proposed. When the SONET is used, an optical leased line of 600 Mbps, called OC-12, or an optical leased line of 2.4 Gbps, called OC-48, is used.

The problem to be solved by the invention is as follows. If a leased line of 1.5 Gbps, called OC-30, is preferable to a subscriber, but if only above-mentioned leased lines OC-12 and OC-48 are available, the subscriber must use leased line OC-48 with the bit rate of 2.4 Gbps because the other leased line OC-12 with the bit rate of 600 Mbps has too low a bit rate for the subscriber. In this case, when a telephone company provides digital service line OC-48 to the subscriber, the public network must always transmit the digital data line OC-48 from the subscriber.

The line capacity of the OC-48 line of 2.4 Gbps is the bit rate of the "maximum use amount". Therefore, all data frames are not always used by a subscriber. Namely, there is the case when Only the data amount corresponding to the OC-1 line with a bit rate of 51.84 Mbps is used or there may be the case when no data frame is used, e.g., during night. In such a case, however, under the current service condition, since it is impossible to distinguish the data frame being used and the data frame not being used, all data frames must be transmitted through the public network without conditions even when the data frame does not include traffic data.

Accordingly, for the telephone company that has a public network, it is wasteful to transmit frames without traffic data, and this is one of the reasons for not increasing the use efficiency of the public network.

Also, for the subscriber, it is not economicalto pay 100 % when 100 % of the line is not being used.

SUMMARY OF THE INVENTION

Accordingly, an object of the present invention is to provide a traffic control system in which a frame not transmitting traffic data and a frame transmitting traffic data can be distinguished and thereby provide a benefit to both the telephone company and the subscriber.

To attain the above object, there is provided, according to the present invention, a traffic control system for controlling traffic in data frames transmitted between a public network and a subscriber through a plurality of channels. Each of the data frames consists of a header and a payload. The header includes a predetermined bit indicating whether or not the payload includes traffic data.

The traffic control system comprises, between the public network and the subscriber, a traffic control unit. The traffic control unit comprises a plurality of channel filters each for receiving the data frames from the subscriber through the corresponding channel, and for transmitting each of the data frames to the public network only when the predetermined bit in the header of the data frame indicates that the payload includes traffic data. The traffic control unit further comprises a channel reproducing unit for receiving data frames from the public network, and for reproducing a data frame that has been discarded, to transmit the received data frames and the reproduced data frame to the subscriber.

Preferably the traffic control unit further comprises a multiplexer, operatively connected between the plurality of channel filters and the public network for multiplexing the outputs of the plurality of channel filters to provide multiplexed data frames to the public network, including traffic data only without an empty frame.

Preferably, the public network is the Synchronous Optical Network (SONET).

Preferably, the traffic control unit and the subscriber are connected through a subscriber line including a plurality of channels.

Preferably, the subscriber line is a leased subscriber line.

Preferably, the traffic control unit is one of facilities belonging to a telephone company.

Preferably, each of the channel filters comprises: a label monitor, operatively connected through one of the corresponding channels to the subscriber for detecting whether or not the data frame includes the predetermined bit; a buffer unit, operatively connected to the label monitor for storing the data frames; and an output control unit, operatively connected to the label monitor and the buffer unit for controlling the buffer unit to discard a data frame when the label monitor does not detect the predetermined bit in the data frame; the output of the buffer being connected to an input of the multiplexer.

Preferably, the channel reproducing unit comprises: a demultiplexer, operatively connected to the public network through a multiplexed line for demultiplexing the received data frames into a plurality of channels; and a time slot assignment unit operatively connected to the demultiplexer for generating, if any, discarded empty data frames.

Preferably, each of the data frames is an STS-N frame defined in the SONET.

Preferably, the predetermined bit is a C2 bit in Path-Overhead in the STS-N frame.

BRIEF DESCRIPTION OF THE DRAWINGS

The above object and features of the present invention will be more apparent from the following description of the preferred embodiment with reference to the accompanying drawings, wherein:

FIG. 3 is a block diagram showing a general structure of a traffic control unit according to the present invention;

DESCRIPTION OF THE PREFERRED EMBODIMENT

Figure 1:
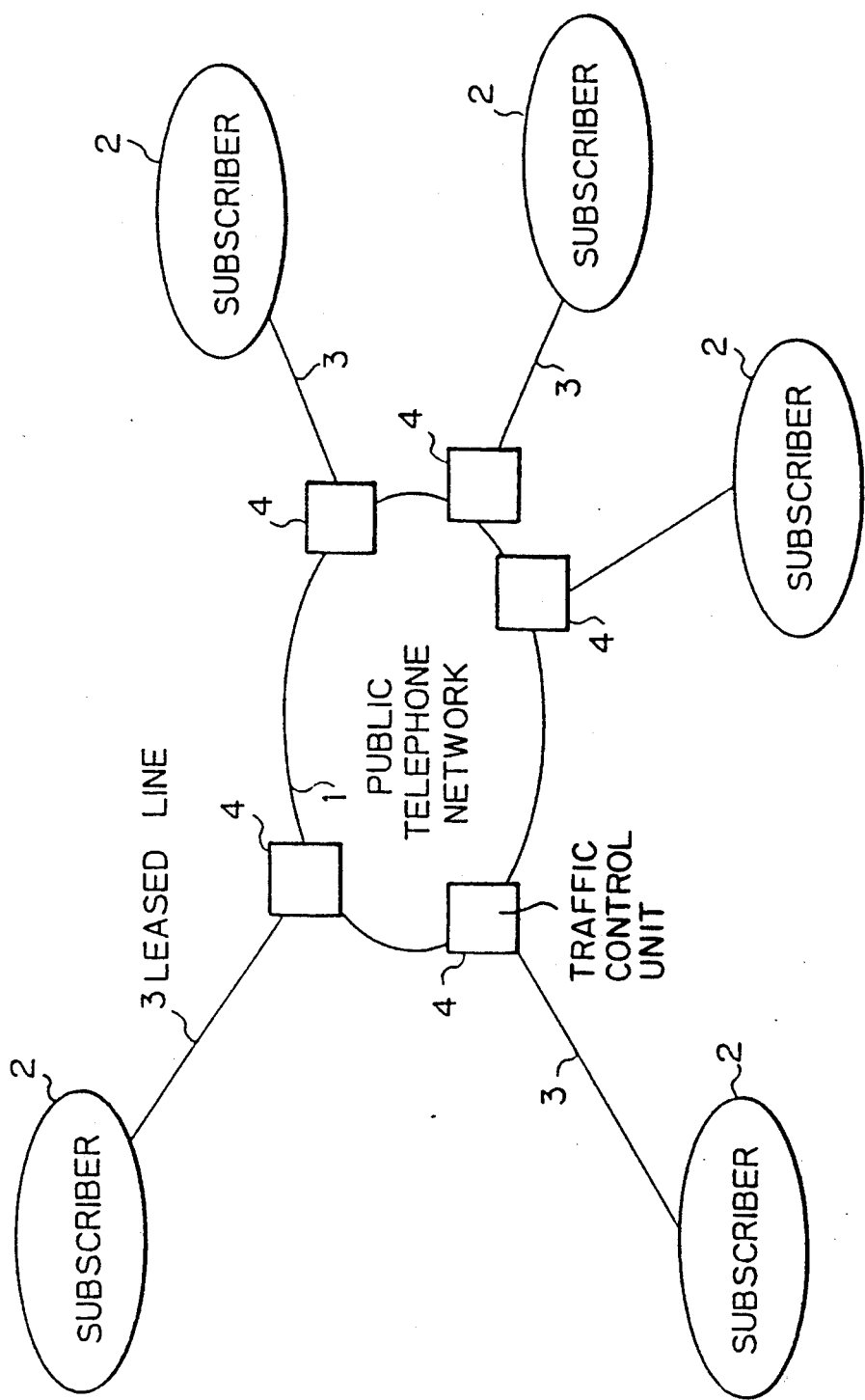
FIG. 1 is a diagram explaining a digital communication network to which the present invention is applied.

Referring to FIG. 1, a digital communication network is shown, in which a plurality of subscribers 2 are connected through leased lines 3 and traffic control units 4 respectively, to a public network 1. Each of the subscribers 2 may have a plurality of terminals of different bit rates such as 2.4 Kbps, 56 Kbps, 1.5 Mbps, 45 Gbps, 600 Mbps, or 2.4 Gbps. To cope with the maximum bit rate of the terminal, each of the leased lines 3 is an optical leased line with the bit rate of 600 Mbps called OC-12, or with the bit rate of 2.4 Gbps called OC-48 and defined in the SONET (Synchronous Optical Network). Therefore, even when a terminal in the subscriber 4 has a very low bit rate of, for example 2.4 Kbps, the terminal must use high-speed optical leased line OC-12 or OC-48, so that most of the data frames become empty.

To reduce the wasteful use of an optical leased line, each of the traffic control units 4 is provided between the subscriber 4 and the public network 1, according to the present invention. The traffic control unit 4 functions to discard a data frame from the subscriber when the data frame does not have traffic data, i.e., when the data frame is empty. Accordingly, a telephone company, which receives the data frame containing actual traffic data, also sends only a data frame containing actual traffic data. Namely, there is no empty data frame from a telephone company (not shown in the FIGURE) to the traffic control unit 4. In the traffic control unit 4, empty data frames are added to the data frames with the actual traffic data from the telephone company through the public network 1. It should be noted that the position of each traffic control unit 4 is not always necessarily located at the side of the public network, but may be located near the subscriber 4. In any case, the traffic control unit 4 belongs to the telephone company.

To effect the above-mentioned discarding of the data frame without the actual traffic data, a predetermined bit C2 in the header of the data frame is used.

Figure 2:
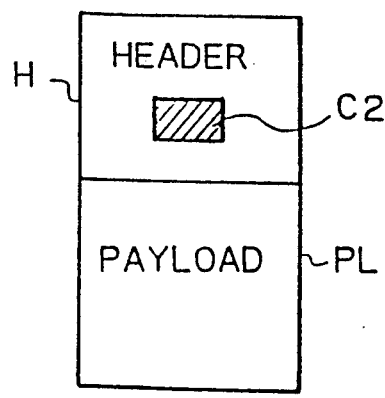
FIG. 2 is a diagram explaining the format of a data frame used in the present invention.

FIG. 2 shows the schematic structure of the data frame used in the SONET. In the FIGURE, the data frame consists of a header H and a payload PL. In the header H, there is a predetermined bit C2 (shown by slashed lines) that is defined in accordance with the regulation of the CCITT. The predetermined bit C2 is called a signaling label and is generally considered, by a telephone company, to be used to prevent a collision of channels between Offices. According to the present invention, however, the predetermined bit C2 is used, in each traffic control unit 4 provided between the public network and the subscriber 2, to identify whether there is actual traffic data in the data frame to determine whether or not the data frame is to be discarded.

FIG. 3 is a block diagram showing a general structure of the traffic control unit 4. In the FIGURE, the traffic control unit 4 is provided between a subscriber and the public network. The traffic control unit 4 includes a channel filtering unit 4A and a channel reproducing unit 4B. The lines between the traffic control unit 4 and the public network are optical lines. The illustrated lines between the traffic control unit 4 and the subscriber are electric lines, however, these lines may be optical lines when an appropriate electric/optic converter and optic/electric converter are provided in the traffic control unit and the subscriber, respectively.

The channel filtering unit 4A determines whether or not traffic data is present in the payload of the frame by checking the predetermined bit C1 in the header H of the data frame transmitted from the subscriber 2 (see FIG. 1). Only when it is determined that the traffic data is present in the data frame, the traffic filter 4A transmits the data frame to the public network 1. When the traffic data is not present in the data frame, the data frame is discarded.

Accordingly, the data frames sent from the public network 1 to a subscriber 2 always have traffic data in their payloads. The channel reproducing unit 4B reproduces empty data frames without traffic data. The data frames with traffic data and the reproduced empty data frames are transmitted from the channel reproducing unit 4B to the subscriber 2.

Thus, by suppressing the number of payloads to be flown into the public network, the number of payloads to be transmitted through the public network can be reduced. In addition, even when a system architecture is added to the subscriber, since the empty data frames are not transmitted to the public network, it may not be necessary to reinforce the transmission ability.

Further, according to the present invention, every time the channel filtering unit 4A detects the presence of traffic data, the number representing the presence of the traffic data is counted up to obtain accounting information. Thus, by detecting the number of payloads actually transmitted to the public network, the amount of services for the subscriber can be known by a numeral so that the accounting can be effected in detail without counting the empty data frame.

Figure 4:
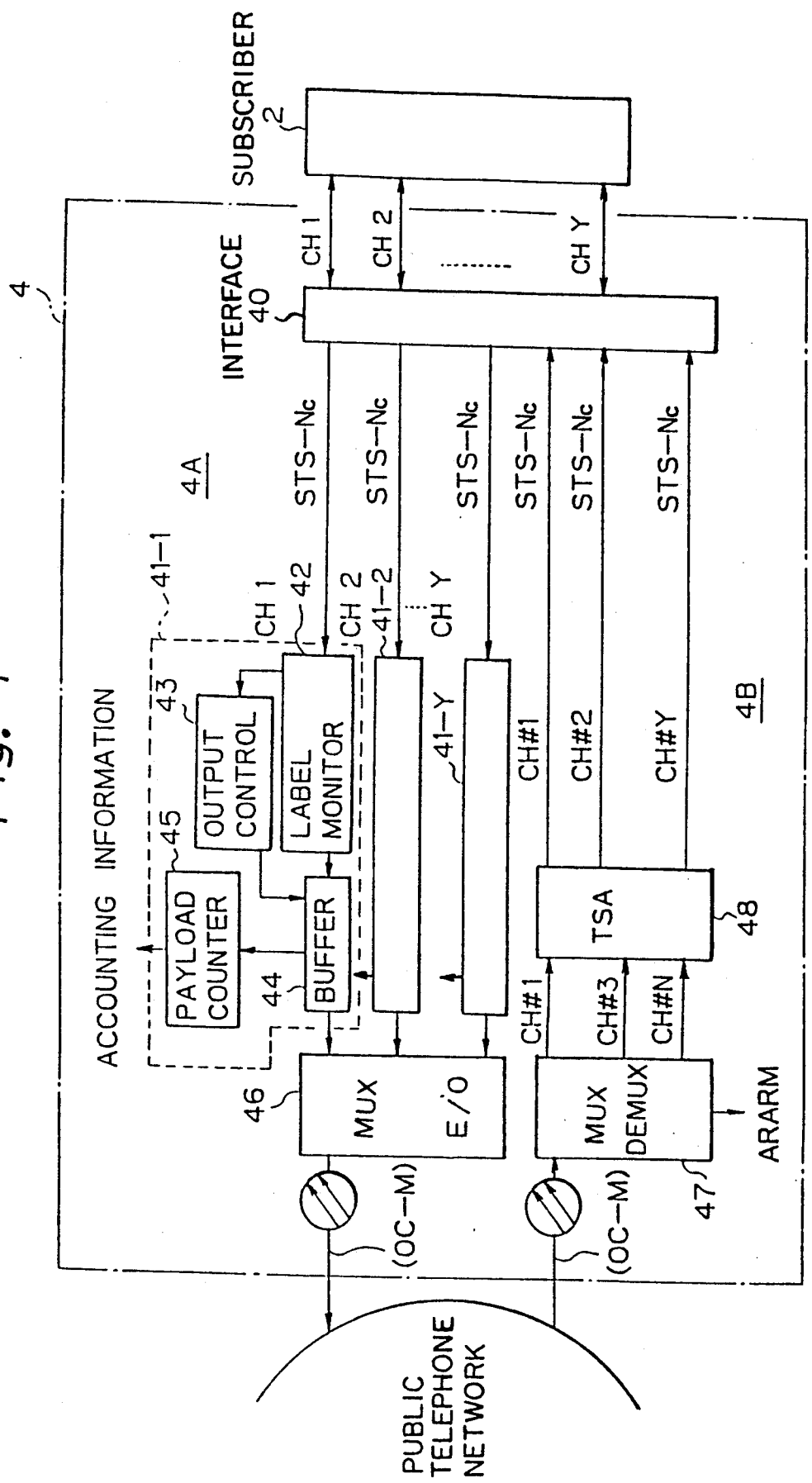
FIG. 4 is block diagram showing a traffic control system according to an embodiment of the present invention.

FIG. 4 is block diagram showing a traffic control system according to an embodiment of the present invention. In the FIGURE, the same reference numerals and symbols used in FIG. 1 and FIG. 3 represent the same parts. In FIG. 4, the traffic control unit 4 consists of the channel filtering unit 4A and the channel reproducing unit 4B.

The channel filtering unit 4A includes an interface 40, a plurality of channel filters 41-1 to 41-Y respectively connected to the channels CH#1, CH#2, .... and CH#Y, and a multiplexer.

Each of the channel filters 41-1 to 41-Y includes a label monitor 42 connected to one of the channels, an output control unit 43 connected to the label monitor 42, a buffer unit 44 connected to the label monitor 42 and the output control unit 43, and a payload counter 45 connected to the buffer 44.

The interface 40 is connected to the subscriber 2 through a plurality of channels CH#1, CH#2, and CH#Y. Each channel is connected to a terminal (not shown) in the subscriber 2. The terminals may be a telephone set, facsimile machine, television set, personal computer, and so forth so that data of various bit rates are transmitted through the channels. The channels CH#1, CH#2, ..., and CH#Y are illustrated in parallel formation, however, these channels are in practice multiplexed into a single leased line. In this embodiment, the signals between the subscriber 2 and the traffic control unit 4 are electric signals. Alternatively, by providing appropriate electric/optic converters in the subscriber 2 and an optic/electric converter in the traffic control unit 4, the signals between the subscriber 2 and the traffic control unit 4 may be optical signals.

The actual data outputs from the buffer units 44 in the respective channel filters 41-1 to 41-Y, except of the output of the buffer unit in which the data frame has been discarded, are multiplexed by the multiplexer 46. For example, when the channel CH#2 does not convey actual traffic data, the data frame in the channel CH#2 is discarded. This multiplexer 46 also functions to convert electric signals into optic signals. The multiplexed optic signals are transmitted through an optical leased line of OC-M to the public network.

The channel reproducing unit 4B includes a demultiplexer 47 and a time slot assignment unit (TSA) 48.

The demultiplexer 47 demultiplexes the multiplexed signals transmitted from the public network through an optical leased line of OC-M into channels CH#1, CH#3, ..., and CH#N. The demultiplexer 47 also functions to convert optic signals into electric signals. Since the channels from the public network 1 do not include an empty channel, the number of demultiplexed channels is not the same as the number of channels connected to the subscriber 2. Accordingly, in the time slot assignment unit 48, the discarded empty frames, for example CH#2, are reproduced. As a result, from the time slot assignment unit (TSA) 48, the data frames of Y channels CH#1, CH#2, ..., and CH#Y are output.

Figure 5:
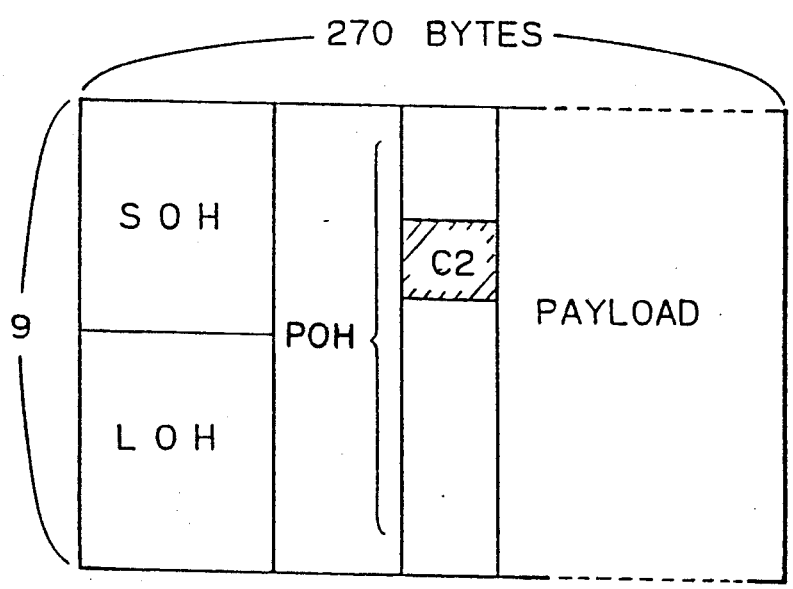
FIG. 5 is a diagram showing the known STS-1 frame format in the SONET used in the present invention.

FIG. 5 is a diagram showing the known STS-1 frame format in the SONET used in an embodiment of the present invention. In accordance with the STS-1 frame format, each data frame consists of a header and a payload. The head ®r consists of SOH (Section Overhead), LOH (Line-Overhead), and POH (Path-Overhead). In the POH, there is the C2 bit indicating whether or not traffic data is present in the data frame. This C2 bit is used, according to the present invention, to determine whether the data frame is to be discarded or not.

Figure 6:
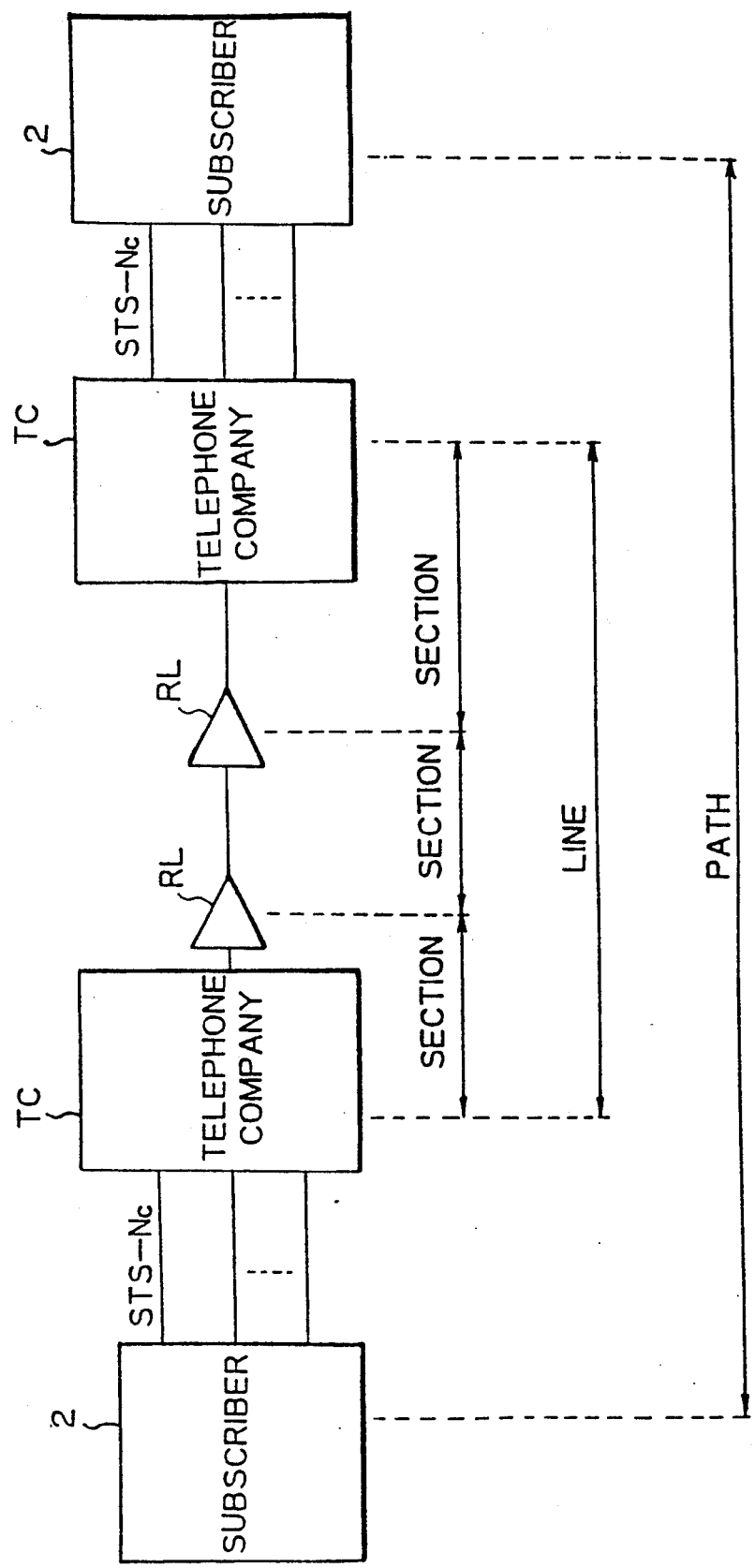
FIG. 6 is a diagram showing a known communication system explaining the overhead of the STS-1 frame shown in FIG. 5.

The places in which the SOH, LOH, and POH are used are described with reference to FIG. 6, which is a diagram showing a known communication system. As shown in FIG. 6, the SOH stores control signals used for transmission through a section between a telephone company TC and a relay office RL; the LOH stores control signals used for transmission through a line between telephone companies TC, and the POH stores control signals used for transmission through a path between subscribers 2. Conventionally, the particular bit C2 in the POH is not used.

In the operation of the device shown in FIG. 4 in a local area network (Local Area Network) and so forth, data frames from subscriber terminals in the subscriber 2 are transmitted through the channels CH#1 to CH#Y respectively on the subscriber leased line 3 (see FIG. 1) to the interface 40 of the traffic control unit 4. Although the subscriber 2 and the interface 40 are connected by plural lines of electric signals, it may be possible to connect them by a single electric multiplexed line in which the channels CH#1 to CH#Y are multiplexed. Further, instead of the electric multiplexed line, an optical multiplexed line may also be possible by providing an electric/optic converter at the output of the subscriber 2 and an optic/electric converter at the input of the traffic control unit 4.

The electric signals on the channels CH#1 to CH#Y have STS-$N_c$ formats.

The data frame on the channel CH#1 is input into the channel filter 41-1 in which the label monitor 42 checks to determine whether the C2 bit in the POH shown in FIG. 5 is "1" or "0". The label monitor 42 also sends the received data frame to the buffer unit 44 without changing it.

In the label monitor 42, when the C2 bit in the POH is detected as "1", namely when it is determined that there is traffic data in the payload PL of the data frame shown in FIG. 5, the label monitor 42 informs the same to the output control unit 43. In response to this information, the output control unit 43 controls the buffer unit 44 to transmit the data frame stored therein to the multiplexer 46 and to inform the payload counter 45 of the presence of the traffic data. The payload counter 45 counts its content every time it receives the information concerning the presence of the traffic data.

The telephone company is informed of the count value of the payload counter 45, whereby counting is effected corresponding to the count value.

On the other hand, when the label monitor 42 detects that the C2 bit in the POH is "0", namely, when it is determined that there is no traffic data, the fact is informed to the output control unit 43 so that the output control unit 43 controls the buffer unit 44 to discard the data frame in the buffer unit 44 and control the payload counter 45 so as not to increment the count value.

A similar operation is carried out in the other channel filters 41-2 to 41-Y.

Then, the payloads, including the actual traffic data, are output to the multiplexer 46 wherein the payloads are multiplexed and converted into an optical signal. Further, in the multiplexer 46, the overhead data for the LOH used between the telephone companies TC and for the SOH used between the relay offices RL are generated. Subsequently, the payloads with the generated overheads are transmitted from the transfer control unit 4 to the public network 1.

On the other hand, the multiplexed data frames transmitted from the public network 1 to the traffic control unit 4 are demultiplexed by the demultiplexer 47 into channels CH#1, CH3, ..., and CHN, for example. In the demultiplexer 47 also, the received multiplexed data frames that are optical signals are converted into electric signals. It should be noted that the data frames received from the public network 1 do not include empty data frames. In the above example, the channel CH2 is an empty data frame so that it does not appear at the output of the demultiplexer 47. To send data frames to the subscriber, it is necessary to arrange full data frames CH#1 to CH#Y. Therefore, the lacking channels must be inserted into the received data frames. The time slot assignment unit (TSA) 48 carries out this insertion of the lacking channels. Thus, the time slot assignment unit (TSA) 48 outputs the full channels CH#1 to CH#Y in the form of STS-$N_c$ format. The data frames in channels CH#1 to CH#Y are transmitted through the interface 40 to the subscriber 2. It is of course possible to transmit the data frames through a multiplexed optical line to the subscriber.

In the demultiplexer 47, the LOH and the SOH are detected to determine whether or not the received data frames in the respective channels are correct. If an error is detected, an alarm signal is generated from the demultiplexer 47.

In the foregoing description, the line between the subscriber and the traffic control unit or between the traffic control unit and the public network is described as the leased line. The present invention, however, is not restricted to this, and any subscriber line may be used. In addition, it is not always necessary to pass the data frames through the public network, but the data frames may be directly transmitted between subscribers without passing through the public network. Further, as a network, the SONET is used in the above described embodiment, however, any network may be used according to the present invention as long as the predetermined bit indicating whether or not the actual traffic data is present can be used.

From the foregoing description, it will be apparent that, in the traffic control system according to the present invention, a channel filter is inserted between a public network and a subscriber, and since the channel filter transmits a payload to the public network only when there is actual traffic data in the payload of the data frame, the amount of data passing through the public network can be suppressed so that the public network can transmit a minimum amount of payloads to the subscribers. In addition, even when a system architecture is added to the subscriber, since the empty data frames are not transmitted to the public network, it may not be necessary to reinforce the transmission ability.

Further, according to the present invention, every time the channel filtering unit 4A detects the presence of traffic data, the number representing presence of the traffic data is counted to obtain accounting information. Thus, by detecting the number of payloads actually transmitted to the public network, the amount of services for the subscriber can be known by a numeral so that accounting can be effected in detail without counting empty data frames. For example, for the OC-48 line, conventionally, the accounting is always constant, such as the line use fee of "million yen/month", regardless of whether the channel is always used or not. By contrast, according to the present invention, the line use fee may be, for example, "base fee(hundred thousand yen) plus hundred yen /payload". Further, the line use fee during the evening when line use amount is relatively small may be set at a low cost such as "50 yen/payload". This low cost during the evening is advantageous for subscribers who conduct computer batch processing during the night hours.

I claim

1. A traffic control system for controlling traffic in data frames transmitted between a public network and a subscriber through a plurality of channels; each of said data frames consisting of a header and a payload; said header including a predetermined bit indicating whether or not said payload includes traffic data, said traffic control system comprising, between said public network and said subscriber, a traffic control unit;

said traffic control unit comprising:

a plurality of channel filters each for receiving said data frames from said subscriber through the corresponding channel, and for transmitting to said public network only the data frames in which said predetermined bit in said header thereof indicates that said payload includes traffic data and discarding the data frames in which said predetermined bit indicates that said payload does not include traffic data; and a channel reproducing unit for receiving data frames from said public network, and for generating a discarded empty data frame when said reproducing what does not receive a data frame from a corresponding channel, to transmit the data frames received from said public network and the data frame generated in said reproducing unit to said subscriber.

2. A traffic control system as claimed in claim 1, further comprising a multiplexer, operatively connected between said plurality of channel filters and said public network, for receiving from said plurality of channel filters outputs containing said data frames to be transmitted to said public network and multiplexing said outputs to provide multiplexed data frames, including traffic data without discarded data frames, to said public network.

3. A traffic control system as claimed in claim 2, wherein each of said channel filters comprises:

a label monitor, operatively connected through one of said corresponding channels to said subscriber, for detecting whether or not said data frame includes said predetermined bit;

a buffer unit operatively connected to said label monitor for storing said data frames; and an output control unit operatively connected to said label monitor and said buffer unit for controlling said buffer unit to discard a data frame when said label monitor does not detect said predetermined bit in said data frame;

the output of said buffer unit being connected to an input of said multiplexer.

4. A traffic control system as claimed in claim 1, wherein said public network is a Synchronous Optical Network (SONET).

5. A traffic control system as claimed in claim 4, wherein each of said data frames is an STS-N frame defined in said SONET.

6. A traffic control system as claimed in claim 5, wherein said predetermined bit is a C2 bit in Path-Overhead in said STS-N frame.

7. A traffic control system as claimed in claim 1, wherein said traffic control unit and said subscriber are connected through a subscriber line including a plurality of channels.

8. A traffic control system as claimed in claim 7, wherein said subscriber line is a leased subscriber line.

9. A traffic control system as claimed in claim 1, wherein said traffic control unit is provided on a side of the public network provided by a public network owner.

10. A traffic control system as claimed in claim 1, wherein said channel reproducing unit comprises:

a demultiplexer, operatively connected to said public network through a multiplexed line, for demultiplexing the data frames received from the public network into a plurality of demultiplexed signals transmitted through a plurality of channels; and a time slot assignment unit, operatively connected to said demultiplexer, for receiving said demultiplexed signals and generating discarded empty data frames.

* * * * *